Inventor
Marvin E. Anderson
by Hill Sherman Meroni Gross & Simpson
Attys

July 17, 1962 M. E. ANDERSON 3,045,220

MAGNETIC MODULATOR SYSTEM

Filed Dec. 11, 1957 3 Sheets-Sheet 2

Inventor
Marvin E. Anderson
by Hill Sherman Meroni Gross & Simpson
Attys

July 17, 1962 M. E. ANDERSON 3,045,220

MAGNETIC MODULATOR SYSTEM

Filed Dec. 11, 1957 3 Sheets-Sheet 3

Inventor
Marvin E. Anderson
by Hill Sherman Meroni Gross & Simpson
Attys 3,045,220

MAGNETIC MODULATOR SYSTEM

Marvin E. Anderson, Chicago, Ill., assignor to Armour Research Foundation of Illinois Institute of Technology, Chicago, Ill., a corporation of Illinois Filed Dec. 11, 1957, Ser. No. 702,097
2 Claims. (Cl. 340—174.1)

This invention relates to a flux responsive magnetic transducer head with a bistable output especially adapted to the playback of pulse type signals, square wave signals, pulse width modulated signals and the like.

It is an object of the present invention to provide a magnetic transducer head having an output which varies in accordance with input signal polarity but is essentially independent of the amplitude of the input signal within predetermined limits.

Another object of the invention is to provide a magnetic transducer head capable of responding to longitudinally recorded square waves and similar signals by shifting between two stable conditions and capable of maintaining a constant amplitude output in either of its two stable conditions independently of the recorded wavelength.

A further object of the invention resides in the provisions of a transducer head which has a bistable output and whose condition of stability is not affected by power failure for removal of the record medium from the head.

A still further object of the invention is to provide a novel transducer head having a bistable output and especially suited for playback of digital type recorded signals.

Yet another object of the invention is to provide a flux responsive bistable transducer head operating in conjunction with a synchronous detector to provide an output responsive to input signal polarity but insensitive to input signal amplitude.

Other objects, features and advantages of the present invention will be apparent from the following detailed description taken in connection with the accompanying drawings, in which.

Figure 1:
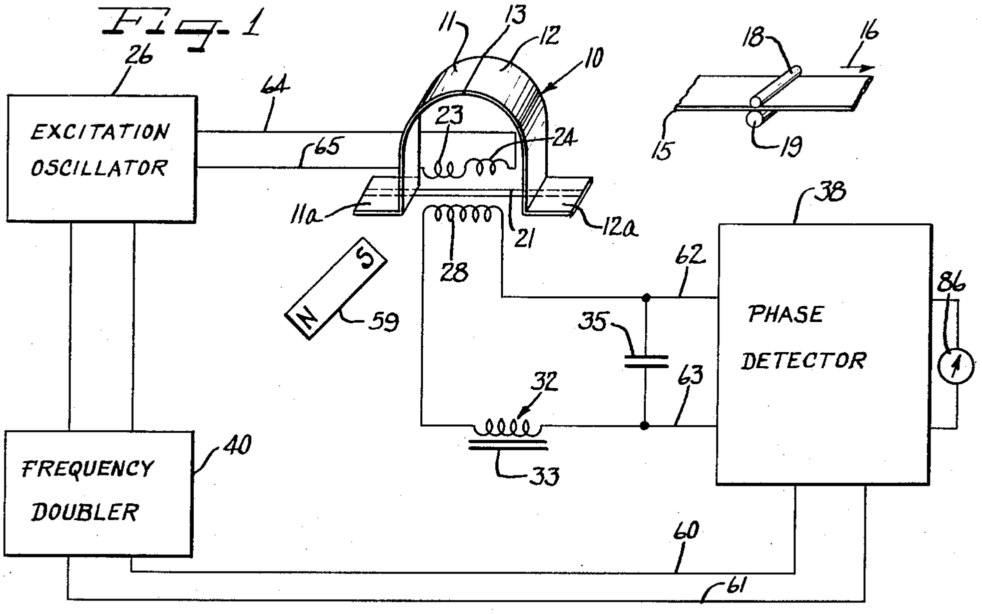
FIGURE 1 is a diagrammatic illustration of a first embodiment of electromagnetic transducer head in accordance with the present invention.

Referring to FIGURE 1, a transducer head in accordance with the present invention may comprise a magnetic core 10 having a pair of pole pieces 11 and 12 defining a longitudinal gap 13 for coupling the head of a maganetic record medium 15 which may be moved in the direction of the arrow 16 by any suitable means such as indicated at 18 and 19. The core 10 may further comprise a relatively thin strip of magnetic material 21 bridging between the lower ends **11*a* and 12*a*** of the pole pieces 11 and 12 to complete a loop magnetic flux path with the pole pieces 11 and 12.

In operation of the head, oppositely phased exciting fluxes are established in adjacent portions of the saturating strip 21 by means of oppositely wound winding portions indicated diagrammatically at 23 and 24 connected in series across an excitation oscillator 26. An ouput winding 28 is also indicated as inductively coupled to the saturating strip 21, and preferably both the winding portions 23 and 24 and the output winding 28 would directly encircle the saturating strip 21 in practice. As is well understood in the art, if a signal flux is introduced at the gap 13 by means of the record medium 15, an unbalance of the exciting fluxes results to produce a second harmonic voltage in the output winding 28 whose phase relative to the exciting voltage from oscillator 26 depends on the polarity of the signal flux introduced at the gap 13.

Figure 4:
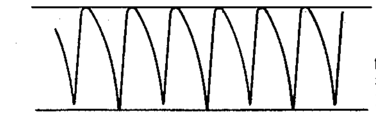
FIGURES 4 and 5 illustrate the waveform across the head output winding with the head connected in the circuit as shown in FIGURE 1, FIGURE 4 showing the output waveform for one polarity of input signal and FIGURE 5 showing the waveform for the opposite polarity input signal.
Figure 5:
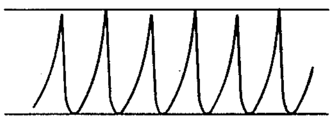
Figure 6:
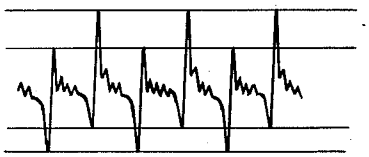
FIGURES 6 and 7 illustrate the waveform of the voltage induced in the output winding of the head of FIGURE 1 with the ferroresonant circuit disconnected from the output winding, FIGURE 6 illustrating the waveform for one polarity of input signal and FIGURE 7 illustrating the waveform for the opposite polarity of input signal.
Figure 7:
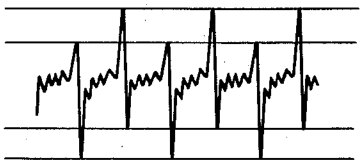

In the embodiment of FIGURE 1, a ferroresonant circuit is provided at the head output comprising output winding 28, an inductor 32 having a magnetic core indicated diagrammatically at 33 and a capacitor 35. The ferroresonant circuit is preferably tuned to the second harmonic frequency which is induced in the output winding 28 by the presence of a signal flux at the gap 13. The circuit should have a fairly high Q, for example of the order of 75, to attain ferroresonant operation. The inductor core 33 should be capable of being saturated by the flux produced by currents in the resonant circuit. FIGURES 6 and 7 illustrate the waveform of the voltage introduced in the output winding 28 with the inductor 32 and capacitor 35 disconnected, the two waveforms shown resulting from input signals of opposite polarity. For different input signal flux amplitudes, the waveform varies in the amplitude of the positive and negative spikes to produce a corresponding change in the output voltage from a suitable detector. In other words, in the prior art head of the general type shown in FIGURE 1, the output varies in amplitude with the amplitude of the signal recorded on the record. By the utilization of the inductor 32 and capacitor 35 as illustrated in FIGURE 1, on the other hand, output waveforms across output winding 28 are as illustrated in FIGURES 4 and 5 for opposite polarity input signals, and the amplitude of these waveforms does not vary with the amplitude of the signal flux introduced at the gap 13 by the record medium 15. Similarly, the voltage appearing across the capacitor 35 or the inductor 32 is independent of input signal amplitude, so that the output from phase or synchronous detector 38 is responsive only to the polarity of the input signal flux. As illustrated in FIGURE 1 a reference second harmonic frequency may be furnished detector 38 from the excitation oscillator 26 by menas of frequency doubler 40.

Figure 2:
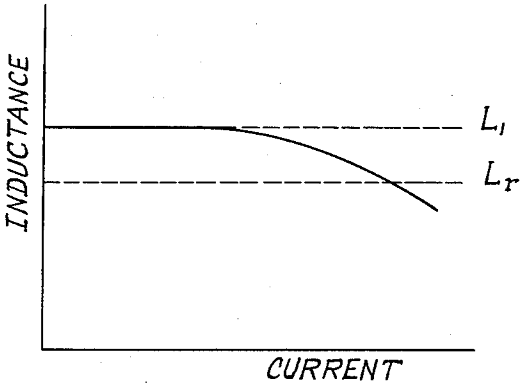
FIGURES 2 and 3 are graphs illustrating certain characteristics of the head of FIGURE 1.
Figure 3:
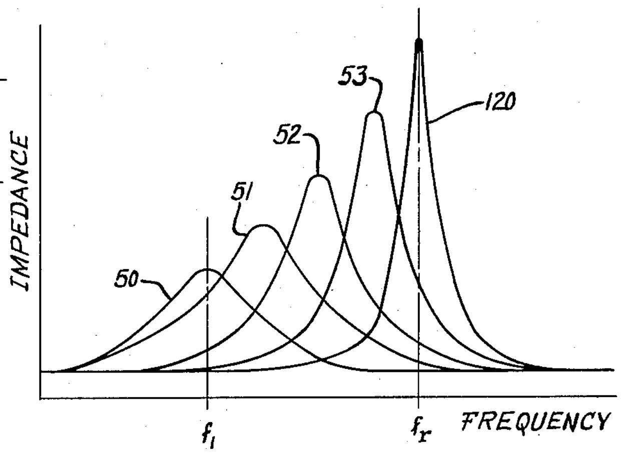

FIGURE 2 illustrates the manner in which the inductance of the inductor 32 may vary as a function of current in the tuned circuit including output winding 28, inductor 32 and capacitor 35. It will be observed that as the current in the tuned circuit increases beyond a certain value due to the introduction of a signal flux at the gap 13, the inductance decreases from a value $L_1$ to a value $L_r$. This change in inductance of the inductor 32 from $L_1$ to $L_r$ corresponds to a change in the resonant frequency of the tuned circuit from $f_1$ to $f_r$ in FIGURE 3. The components of the tuned circuit are selected so that the frequency $f_r$ corresponds to the second harmonic of the output from the excitation oscillator 26. It is found in practice that when the full excitation current is supplied to the winding portions 23 and 24, the output circuit will assume one of its conditions of stability even with no signal flux applied at the gap 13. Thus as the excitation current is initially applied, the tuned circuit will be tuned to the lower frequency $f_1$ below the second harmonic frequency; however, there will be sufficient current in the tuned circuit under this condition to tend to decrease the inductance of inductor 32 below its initial value $L_1$. In FIGURE 3, curve 50 illustrates the initial response of the tuned circuit with inductor 32 having a value $L_1$ so that the circuit is tuned to a frequency of $f_1$. As current flow in the circuit causes the value of inductance of inductor 32 to decrease slightly as represented in FIGURE 2, the circuit will be tuned to a new frequency as represented by the curve 51, for example. However, as the frequency to which the circuit is tuned approaches the second harmonic frequency, the current in the circuit tends to increase further, further decreasing the inductance of inductor 32 to cause operation successively as represented by curves 52 and 53 in FIGURE 3, until the condition of stability is reached with inductor 32 having a value $L_r$, and the circuit tuned to the second harmonic frequency ($f_r$). Actually, this shifting of the circuit from a neutral condition to a condition of stability takes place very rapidly with in effect a snap action when full excitation current is applied to the winding portions 23 and 24.

If a signal is now applied at the gap 13 by the record medium 15 of polarity to require the opposite condition of stability of the ferroresonant circuit, when the second harmonic voltage in the output winding 28 due to input signal flux reaches a critical level, the ferroresonant circuit assumes its opposite condition of stability with a snap action wherein the voltage across either the inductor 32 or the capacitor 35 is again of constant amplitude, but is reversed in phase with respect to the excitation oscillator 26. The term "ferroresonant" as used herein refers to the mechanism illustrated in FIGURE 3.

In the illustrated embodiment, a bias flux is introduced into the core 10 by means of a bias magnet 59 as shown in FIGURE 1, to bias the head to a null condition with a value of excitation current in windings 23 and 24 below that required for bistable operation. The same result may be achieved by circulating a direct current derived from a high impedance source through the output winding 28. This biasing of the head to a null condition insures that head output phase reversal will coincide substantially with the reversal in phase of the input signal flux. The head is in a null condition when there is a zero output from detector 38. Using an excitation curren below the level at which ferroresonance occurs is necessary in order to obtain a zero output. When the bias adjustment is completed the excitation current is returned to its normal level.

To illustrate the bistable operation of the head of FIGURE 1 a tape recorded with a sine wave can be placed in operative relation to the pole pieces 11 and 12 as illustrated in FIGURE 1. The output voltage measured across either the capacitor 35 or inductor 32 will be of constant amplitude and phase with respect to the excitation current. As the tape is moved over the head and the signal polarity changes, the phase of the ferroresonant output flips back and forth between the two stable states. If the tape is removed from the head, the phase relationship remains the same. Also, if the excitation source is disconnected and later reconnected, the phase of the output again assumes the same relation to the excitation current phase.

It appears that the ferroresonant operation can be obtained at any excitation frequency that will produce a sufficient output voltage. Since a rather large amount of voltage is necessary in order to bring the core 33 of inductor 32 into the saturation range, the excitation frequency utilized in the embodiment was 80 kilocycles per second. The Q of the output circuit is also dependent on the frequency and this factor should also be taken into consideration in selecting the excitation frequency. Further, the voltage input level at which ferroresonant operation is attained is a function of frequency; as the frequency is increased a higher voltage input level is required. Therefore, an optimum excitation frequency must be sought if maximum sensitivity is to be attained.

For ferroresonant operation the excitation current has to be increased somewhat above the level for best operation without ferroresonance. However, as the excitation current is increased the signal flux necessary to change the phase of the output is increased. If there is sufficient signal flux available a higher output voltage results. As the excitation current is decreased the output level also decreases until a point is reached where ferroresonance can no longer be sustained. In general, the lowest excitation current which will maintain ferroresonance will provide maximum sensitivity.

Any recorded wavelength can be played back and cause ferroresonant operation provided the output of the head is sufficient to bring the core 33 of inductor 32 to saturation. The playback gap 13 has the same effect as is usual with all conventional heads; that is, when the recorded wavelength approaches the gap length the head output voltage approaches zero. Therefore, as the wavelength of the recording being played back decreases, the head output voltage decreases and ferroresonant operation is no longer maintained when the output voltage of the head fails to reach the critical value. Greater sensitivity can be attained at lower flux levels by reducing the cross section of the saturable core 33 of inductor 32 thereby causing flux saturation at a lower flux level.

The output phase of the ferroresonant circuit can be flipped back and forth at any rate as low as desired. However, there is an upper limit to the response of such a device which is a function of the excitation frequency, the Q of the resonant circuit, and the amount of flux required to saturate the core 33 of inductor 32. A particular head constructed in accordance with FIGURE 1 was found to operate at over 200 cycles per second.

The output voltage level of a modulator head such as illustrated in FIGURE 1 is a function of the gap length. Normally the gap length in digital work is made as large as is consistent with the minimum pulse length to be played back. One head in accordance with FIGURE 1 was provided with a .005 inch gap since ferroresonance is more easily obtained with high level signals. Ferroresonant operation was also attained with a modulator head having a .0005 inch gap.

It is believed that the basic design illustrated in FIGURE 1 is applicable to all types of pulse, square wave, pulse-width modulated and other similar types of recordings and has the advantage that the bistable output is directly obtainable from the modulator head circuit.

Since the system is insensitive to signal variations below a critical value, the system is capable of responding to longitudinally recorded square waves independently of the recorded wavelength; also the circuit's memory is not affected by power failure or removal of the record medium from the gap of the head. The system has been found to work very satisfactorily with a synchronous detector.

By way of example, the inductor 32 may be provided with a core 33 of "Ferroxcube 3C" material which is a manganese zinc ferrite manufactured by a process which includes the intimate mixing of these oxides and either pressing or extruding the mixture into a suitable shape, and sintering. The composition of the saturable strip 21 may comprise 79% nickel, 17% iron and 4% molybdenum. This material is known as "Mo-permalloy."

Figure 8:
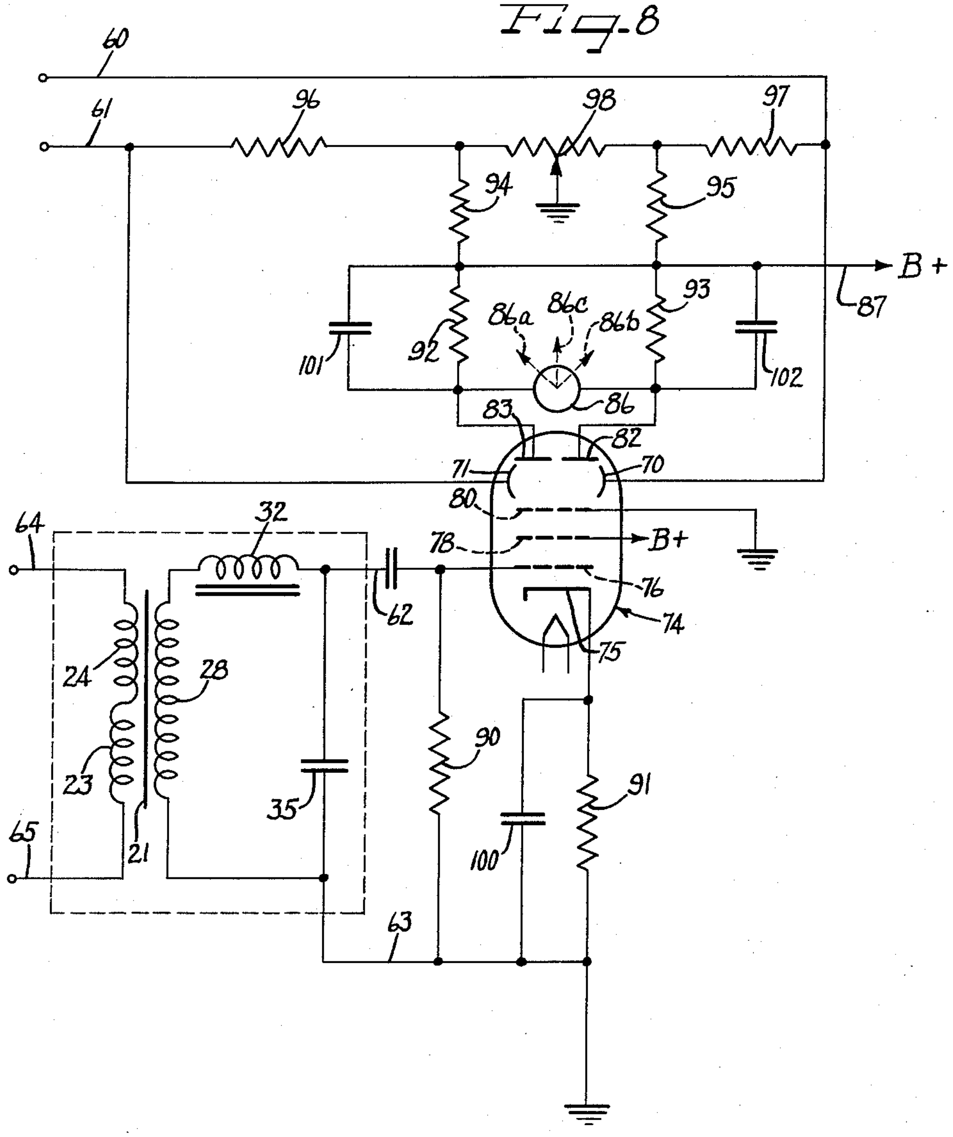
FIGURE 8 is a circuit diagram illustrating a suitable synchronous detector for use in the circuit of FIGURE 1.

The detailed circuit diagram for the phase detector 38 of FIGURE 1 is shown in FIGURE 8. Corresponding parts have been given the same reference numerals in the circuits of FIGURES 1 and 8. Thus, reference numerals 60 and 61 in FIGURES 1 and 8 represent the connections between the frequency doubler 40 and the phase detector, reference numerals 62 and 63 represent the connections between capacitor 35 and the phase detector, and reference numerals 64 and 65 represent the connections between excitation oscillator 26 and excitation windings 23 and 24 of the head. The reference second harmonic frequency from doubler 40 is applied by means of lines 60 and 61 to deflector electrodes 70 and 71 of tube 74 which may be a type 6AR8 double-plate sheet-beam tube. The output of the ferroresonant circuit is delivered by lines 62 and 63 to develop a signal voltage between cathode 75 and control grid 76 of the tube. The D.C. supply voltage is applied to accelerator grid 78, while suppressor grid 80 is grounded. The input to the deflector electrodes 70 and 71 serves to direct the electron beam to either of the two plates 82 and 83 while the signal applied to grid 76 varies the intensity of the beam.

In operation, with full excitation voltage, the ferroresonant circuit will be in one of its stable conditions. Thus, there will be a constant amplitude second harmonic signal delivered to lines 62 and 63 as illustrated in FIGURE 4 or FIGURE 5. With an input signal of one phase, plate 82 will be at a higher potential than plate 83, while in the opposite phase, plate 83 will be at a higher potential than plate 82. As indicated in FIGURE 8, a polarity sensitive meter 86 is connected between plates 82 and 83 to indicate the phase of the signal from the ferroresonant circuit. It will be noted that supply voltage is connected to line 87 in FIGURE 8.

Since during full excitation of the head, the ferroresonant circuit will be in one or the other of its conditions of stability, meter 86 will be in one of its extreme conditions indicated at **86*a* and 86*b*, and will be shifted between these extreme positions as signal flux of changing polarity is introduced into the head 10. With a low value of excitation current from oscillator 26 below that required for ferroresonant operation, bias magnet 59 in FIGURE 1 is adjusted until meter 86 gives a zero reading as represented at 86*c*** in FIGURE 8.

The values of resistors 90–97 in FIGURE 8 may be as follows: 1 megohm, 2.0 kilohms (2000 ohms), 33 kilohms, 33 kilohms, 220 kilohms, 220 kilohms, 390 kilohms and 390 kilohms, respectively. Potentiometer 98 may have a value of 10 kilohms. Capacitors 100, 101 and 102 may have values of 25 microfarads, .1 microfarads and .1 microfarads, respectively.

Figure 9:
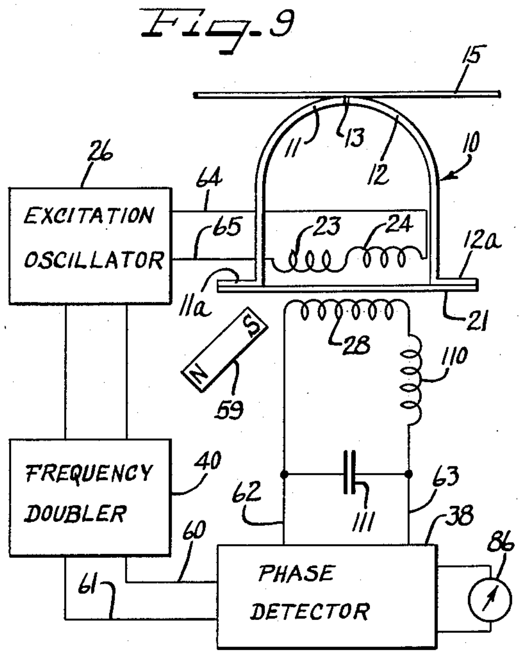
FIGURE 9 is a diagrammatic illustration of a modified transducer head in accordance with the present invention wherein the ferroresonant action takes place in the saturating strip of the head core.

FIGURE 9 illustrates a modified head in accordance with the present invention wherein corresponding reference numerals have been applied to corresponding parts. In this embodiment, the ferroresonant circuit has been modified by utilizing an air core inductor 110 in conjunction with a capacitor 111 selected to provide ferroresonant operation. It is somewhat surprising that this circuit provides the characteristic ferroresonant operation with a bistable output of constant amplitude independent of variations in amplitude of the input signal flux. Since saturation effects such as represented in FIGURE 2 are not to be expected in an air core solenoid, it must be assumed that the ferroresonant action is taking place in the output winding 28. Accordingly, if the output winding 28 provides a convenient value of inductance, inductor 110 may be omitted and ferroresonant operation still obtained.

It will be understood that as in the embodiment of FIGURE 1, the ferroresonant circuit of FIGURE 9 is tuned to the second harmonic of the frequency of excitation oscillator 26 so as to provide operation as illustrated in FIGURE 3, and stable output waveforms as represented in FIGURES 4 and 5. As in the embodiment of FIGURE 1, bias magnet 59 is adjusted to provide a zero output at meter 86 with a low value of excitation current from oscillator 26 below that required for ferroresonant operation. The windings 23, 24 and 28 preferably actually encircle saturating strip 21 so as to provide increased coupling between the windings and the strip. The strip 21 is preferably of greatly reduced cross section in comparison to the cross section of pole pieces 11 and 12 and may have a cross section such that a maximum signal flux from the record medium 15 will produce a flux density in saturating strip 21 of the order of ⅓ the value of saturation flux density for the material of the strip. The value of excitation current may be such that the flux densities produced by windings 23 and 24 in adjacent regions of the saturating strip 21 may have an amplitude of the order of saturation flux density for the material of the strip 21.

*Summary of Operation*

In both the embodiments of FIGURES 1 and 9, bias magnet 59 is first oriented to provide a zero output at meter 86 with a low value of excitation current from oscillator 26 below that required for ferroresonant operation of the circuit including output winding 28. Full excitation current is then supplied to the windings 23 and 24, and under these circumstances it is found that there will be a slight unbalance resulting in sufficient current in the output circuit including output winding 28 to cause a shift in the resonant frequency of the output circuit, for example from that illustrated by curve 50 in FIGURE 3 to that illustrated by curve 51. Since the output circuit is excited with a frequency, $f_r$, which is the second harmonic of the frequency of oscillator 26, this shift in the resonant frequency of the output circuit will cause a corresponding increase in the current of the output circuit. This increase in current will cause a corresponding reduction in the inductance of the output circuit as illustrated in FIGURE 2 to again change the resonant frequency of the output circuit, for example to that represented by curve 52 in FIGURE 3. This process progresses rapidly with a snap action until the output circuit reaches a stable condition as represented by curve 120 in FIGURE 3 wherein the output circuit is tuned to the frequency, $f_r$, corresponding to the second harmonic of oscillator 26.

The voltage waveform appearing across capacitor 35 in FIGURE 1 or capacitor 111 in FIGURE 9 will then be as represented in FIGURE 4 or 5.

When a signal is introduced at gap 13 by the record member 15 of polarity to shift the output circuit to its opposite condition of stability, meter 86 will shift from one polarity indication to the opposite polarity indication, but the output voltage will be independent of the input signal flux. Thus, if a square wave signal of very long wavelength is recorded on the record medium 15, the output of the system of FIGURE 1 or 9 will be of constant amplitude in spite of the inherent reduction in leakage flux from a relatively long constant amplitude longitudinally recorded signal. Further, in the event of a temporary power failure, upon restoration of exciting flux, the ferroresonant circuit will assume the same condition of stability as it had prior to the power failure.

It will be apparent that many modifications and variations may be effected without departing from the scope of the novel concepts of the present invention.

I claim as my invention:

1. In combination, a magnetic head having a signal flux path and having means for coupling the signal flux path to a magnetic record medium to introduce a signal flux into said path, exciting means coupled to said signal flux path for applying oppositely directed high frequency magnetomotive forces to said signal flux path for cyclically varying the reluctance thereof, output winding means coupled to said flux path for providing a cyclically varying output signal in accordance with the variation of magnetic flux in said path, a ferroresonant circuit connected with said output winding means and comprising inductance means having a saturable core and capacitance means of value tuning said circuit to a first frequency $f_1$ when said saturable core is outside the saturation range and tuning said circuit to a higher frequency $f_r$ when said saturable core is in the saturation range, means connected to said exciting means for maintaining said saturable core in the saturation range in operation of said head, said frequency $f_r$ at which said ferroresonant circuit is resonant with said core in said saturation range being equal to a harmonic of the frequency of said exciting means to provide bistable operation of said head.

2. In combination, a magnetic head having a signal flux path with a saturable portion and having means for coupling the signal flux path with a magnetic record medium to introduce a signal flux along said path, exciting means coupled to said flux path for applying oppositely directed high frequency magnetomotive forces to said signal flux path for cyclically varying the reluctance thereof, output winding means on said saturable portion of said flux path for providing a cyclically varying output signal in accordance with the variation of magnetic flux in said saturable portion of said path, a ferroresonant circuit comprising said output winding means and capacitance means connected with said output winding means and tuning said circuit to a first frequency $f_1$ when said saturable portion of said signal flux path is outside of the saturation range and tuning said circuit to a higher frequency $f_r$ when said saturable portion of said flux path is in the saturation range, means connected with said exciting means for maintaining said saturable portion in said saturation range during operation of said head, said frequency $f_r$ at which said ferroresonant circuit is resonant with said saturable portion of said flux path in said saturation range being equal to a harmonic of the frequency of said exciting means to provide bistable operation of said head.

References Cited in the file of this patent

UNITED STATES PATENTS

| | | |
|---|---|---|
| 2,418,553 | Irwin | Apr. 8, 1947 |
| 2,722,569 | Loper | Nov. 1, 1955 |
| 2,804,506 | Schurch et al. | Aug. 27, 1957 |
| 2,822,533 | Duinker et al. | Feb. 4, 1958 |
| 2,855,466 | Wiegand | Oct. 7, 1958 |
| 2,870,270 | Nagai et al. | Jan. 20, 1959 |
| 2,875,429 | Quade | Feb. 24, 1959 |
| 2,901,676 | Mittag | Aug. 25, 1959 |
| 2,918,535 | Wiegand | Dec. 22, 1959 |

OTHER REFERENCES

"A Flux-sensitive Reproducing Head for Magnetic Recording Systems" (Daniel), Proceedings of the Institute of Electrical Engineering, vol. 102, No. B4, pp. 442–446, July 1955.